Sept. 4, 1956    E. J. SCHAEFER    2,761,985
SUBMERSIBLE MOTOR CONSTRUCTION
Filed Sept. 24, 1953
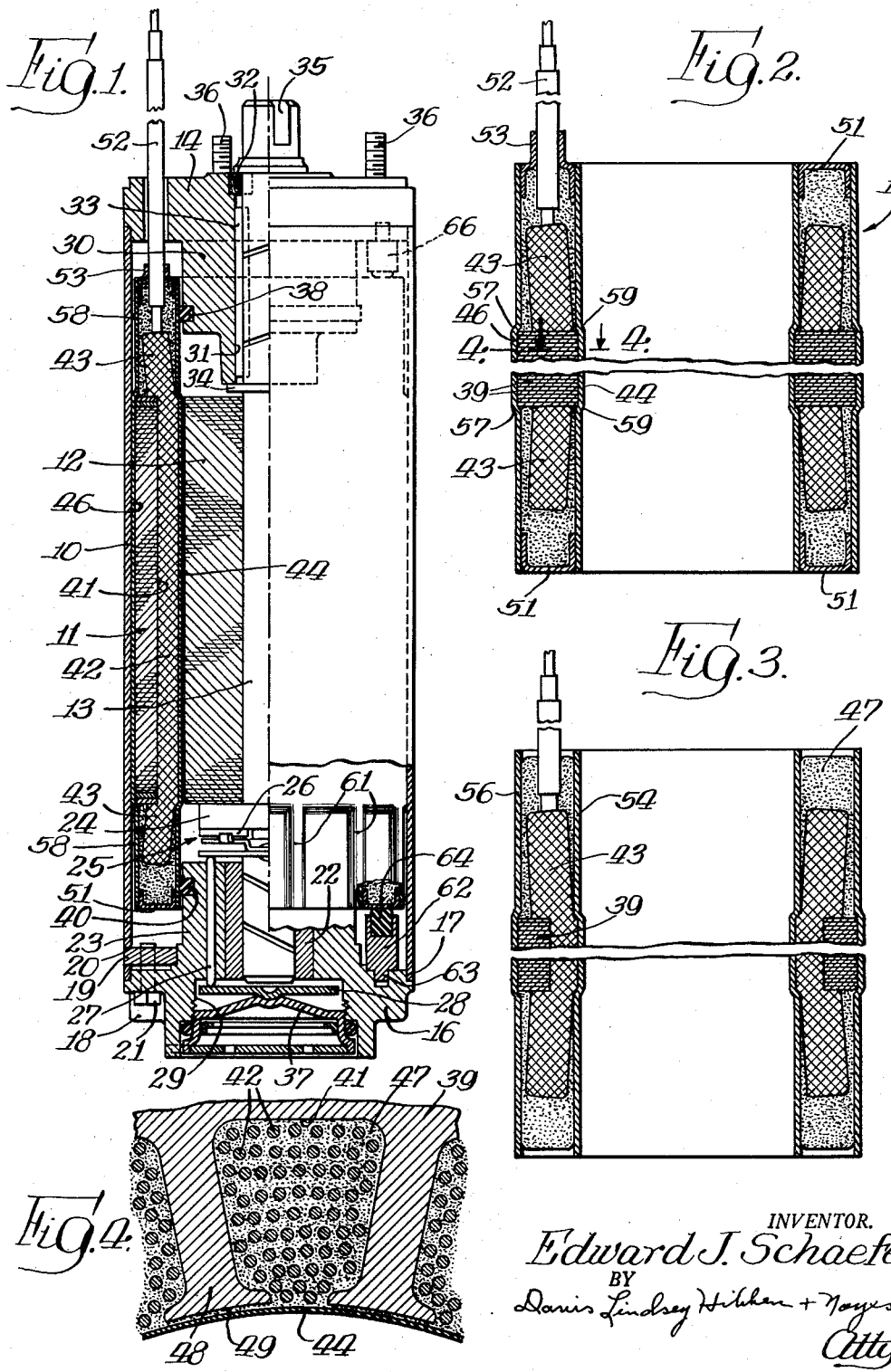
INVENTOR.
Edward J. Schaefer,
BY
Davis Lindsey Hibben + Noyes
Attys.

United States Patent Office 2,761,985
Patented Sept. 4, 1956

2,761,985

SUBMERSIBLE MOTOR CONSTRUCTION

Edward J. Schaefer, Fort Wayne, Ind.

Application September 24, 1953, Serial No. 382,109

7 Claims. (Cl. 310—87)

This invention relates generally to electric motors and particularly to electric motors adapted for operation when submerged in a liquid.

Electric motors of the submersible type have heretofore been made which have an outer casing completely enclosing both the rotor and the stator and completely sealing them from contact with the liquid in which the motor operates. Such a motor, however, requires a highly effective seal about the motor shaft and necessitates the provision of lubrication within the casing for the shaft bearings. Lubrication difficulties may be avoided by utilizing the liquid in which the motor operates as the lubricant but in such a construction the stator and rotor must be separately sealed to prevent access of the liquid to the rotor and stator windings and still permit free flow of the liquid through the motor to the bearings thereof. With the latter construction, not only are lubrication difficulties eliminated but also the necessity of using rotating seals is avoided.

In a motor of this character, the rotor may be readily protected since it is of the squirrel cage type without insulated windings. Thus, the exterior of the rotor may be protected by such conventional methods as plating the exterior surface, or painting it, or subjecting the surface to the corrosion prevention treatment known commercially as "bonderizing" which involves the formation of an iron phosphate coating by chemical action.

The stator, which is of annular construction extending about the rotor, is usually enclosed externally by a rigid metal casing or shell extending endwise beyond both ends of the stator and having end closures rigidly secured thereto. The interior of the stator presents a somewhat greater problem in providing a suitable seal which will perform its chief function of excluding liquid from the windings of the stator but at the same time will not cause excessive electrical losses in the motor. One solution which is highly satisfactory is disclosed in my copending application Serial No. 131,888, filed December 8, 1949, now U. S. Patent No. 2,654,848, issued October 6, 1953, wherein I have described and claimed a stator construction in which the inner bore of the stator core is sealed by means of a thin non-self-supporting metal liner adhesively bonded thereto, the metal liner being sufficiently thin to avoid substantial electrical losses. However, the construction disclosed in my Patent No. 2,654,848 utilizes the end closures for the motor housing to clamp or otherwise hold the stator laminations together, and the inner thin liner may also be bonded to the end closures as well as to the interior of the stator bore. In fact, all of the submersible motor constructions heretofore proposed have involved an arrangement wherein the outer motor shell, the stator core, and the end closures are secured together as a unit in a more or less permanent relation.

The present invention comprises a substantial improvement over the prior art in that the stator element of the motor is constructed in the form of a readily removable self-contained unit or cartridge such that it can be easily installed or withdrawn from the outer motor casing or shell thereby facilitating and simplifying both the initial assembly and repair of submersible motors.

Accordingly, the general object of the invention is to provide a novel replaceable or cartridge type stator unit for submersible electric motors.

A further object of the invention is to provide a novel self-contained stator construction sealed at its interior and exterior and adapted to operate in a liquid.

Another object of the invention is to provide a novel stator construction as in the preceding object but further characterized in that the motor is not subject to excessive electrical losses due to the seal.

An additional object of the invention is to provide a novel submersible motor construction wherein the stator is mounted in readily removable relation within the outer motor housing whereby to facilitate replacement and repair.

Other objects and advantages of the invention will become apparent from the following description taken in connection with the accompanying drawing, in which:

Fig. 1 is a longitudinal view, partially in section, of a motor embodying the features of the invention;

Fig. 2 is a broken sectional view, on an enlarged scale, of the stator of the motor shown in Fig. 1 as removed from the motor housing;

Fig. 3 is a view similar to Fig. 2 but showing a modified form of the invention; and Fig. 4 is a fragmentary sectional view, on an enlarged scale, taken substantially on the line 4—4 of Fig. 2.

As heretofore mentioned, the present invention relates to submersible electric motors, and in particular contemplates a motor of such character that the liquid, such as water, in which the motor is submerged is free to pass into the motor between the stator and the rotor thereof. Motors of this type are frequently used in the bottom of a well and are connected to a pump to drive the latter. More specifically, the motor is usually suspended, and receives its support, from the pump casing and has its drive shaft connected to the shaft of the pump for operating the latter. Because of space restrictions, such a motor is usually made of small diameter but of quite elongated form.

Referring first to Figs. 1, 2 and 4 of the drawing, a submersible motor embodying the features of the present invention may comprise an outer housing or casing in the form of a cylindrical metal sleeve 10, preferably of stainless steel, within which is removably mounted an annular stator unit, designated generally at 11 and described hereinafter in detail, with a rotor 12 disposed within the stator. In the present instance, the stator and rotor are shown as being positioned intermediate the ends of the external casing 10, and the rotor 12 is carried on a shaft 13 supported in suitable bearings mounted at the opposite ends of the casing 10.

The opposite ends of the cylindrical casing 10 are closed by means of a pair of detachable end closures or caps 14 and 16 which are disposed at the upper and lower ends, respectively, of the casing. The manner of securing the end closures 14 and 16 to the outer casing 10 is illustrated in Fig. 1 in connection with the bottom closure member 16, but it will be understood that the upper closure member 14 is detachably secured in a like manner. Thus, the lower end of the cylindrical casing 10 is fitted on a reduced portion, as at 17, on a radial flange portion 18 of the bottom closure 16, and a plurality of lugs or retainers 19 having threaded apertures extend radially inwardly through apertures or slots 20 in the outer shell 10 adjacent the flange portion 18, A plurality of screws 21 extend upwardly through the flange portion 18 and engage the threaded openings in the lugs 19 for securely clamping the closure member 16 to the lower end of the external casing 10.

The bearing structure at the lower end of the rotor shaft 13 includes a sleeve 22 surrounding the lower end of the shaft 13 for radial support, the sleeve 22 being mounted in an axial extension 23 projecting upwardly from the closure member 16. The lower bearing structure also comprises a thrust bearing arrangement of a modified Kingsbury type comprising a rotating thrust bearing element 24 secured to the shaft 13 for rotation therewith and a stationary thrust bearing assembly, indicated generally at 25, and including a plurality of tiltable bearing shoes or segments 26. The bearing segment assembly 25 is constructed for automatic self-leveling and alignment by means of a plurality of pins 27 extending through the axial extension 23 and coacting between the bearing segment assembly 25 and a centrally pivoted leveling disk 28 disposed within an axial recess 29 at the outer end of the closure member 16. For a more complete description of the thrust bearing arrangement, reference is made to my copending application Ser. No. 280,705, filed April 5, 1952. When the motor is designed for operation in water, the radial bearing member 22 and the rotating thrust bearing member 24 are preferably made of graphite. However, it will be understood that the bearing members may be made of any suitable material dependent upon the character of the particular liquid in which the motor operates.

The closure member 14 at the upper end of the motor likewise has an axial extension 30 which in this case is provided with a central bore 31. A plurality of felt pads, as at 32, are disposed in a counter-bore at the outer end of the closure member 14 and fit loosely around the shaft 13. A radial bearing member 33, preferably of graphite, is mounted within the central bore 31 for holding the upper end of the rotor shaft 13 in operating relation. The rotor shaft 13 also carries a protective collar 34 which may abut the lower axial end of the closure 14 in order to protect the bearing member 33 from being damaged by shifting of the rotor 12 during shipping or handling of the assembled motor. The extreme upper end of the shaft 13 is provided with means for connecting it to the shaft of the pump, and in this instance is shown as having a transverse groove 35 into which a tongue on the pump shaft or a separate coupling member may be inserted. A plurality of attaching studs 36 project upwardly from the closure 14 for mounting the motor below the pump.

During operation of the motor, it will be understood that the liquid in which the motor is submerged may pass freely through the felt pads 32 and thence through suitable passages (not shown) in the upper bearing enclosure, through the air gap between the rotor 12 and the stator 11, and thence to the bearing structure at the lower end of the motor. For purposes of the present invention, these details of the internal flow or passage of the working liquid in the motor need not be described in detail. However, in order to avoid continuous circulation of water through the motor with consequent danger in many cases of the deposition of salts within the motor interior, it may be pointed out that the lower end of the motor is closed by a threaded cap 37 which also serves as a pivot for the leveling disk 28. Thus, the motor normally operates with only its initial filling of water. To prevent leakage of water from the motor through the apertures 20 having the lugs 19 fitted loosely therein, I also provide a pair of upper and lower seal rings 38 and 40, respectively, which coact between the end closures 14 and 16 and the inner periphery of the stator unit 11.

As hereinbefore mentioned, in motors of this type where liquid is admitted into the interior thereof, the rotor 12 as well as the stator 11 must be separately sealed. The rotor, which is usually of the squirrel cage type without insulated windings is easily protected against corrosion by more or less conventional methods such as by plating, painting or otherwise applying a protective coating to the exterior of the rotor. The stator, however, requires special precautions for its adequate protection because of the voltage characteristics of the windings in the stator.

As seen in Figs. 1 and 2, the stator in the present invention comprises a core structure formed by a stack of annular laminations indicated at 39 in Figs. 2 and 4, and the laminations are punched in the usual manner with a plurality of inwardly opening slots 41 to receive the usual stator windings 42. Such windings have end turns which project beyond the stack of laminations at each end thereof, as indicated at 43. Although not illustrated in the drawing, the stack of laminations 39 is secured together as a unitary assembly by any suitable means, such as by a plurality of longitudinally extending straps received in grooves or recesses formed in the outer periphery of the stack and tack welded or otherwise secured thereto.

For sealing the stator core structure as a self-contained unit, I provide a pair of concentric inner and outer shells 44 and 46, respectively, the inner shell or liner 44 being quite thin and being adhered firmly to the core structure at the inner bore thereof by means hereinafter described in detail, and the outer shell 46 being drawn or shrunk snugly around the exterior of the core structure and fitting tightly thereagainst. For sealing purposes, I have found that the outer shell 46 may also be relatively thin and may be tightly fitted, as by shrinking, directly against the exterior of the core structure. However, the thin inner liner or shell 44 requires special precautions so as to prevent access of liquid to the windings 42 while at the same time resisting internal pressure which is developed when the motor heats up during operation. Of course, the inner liner or shell 44 must also be sufficiently thin so that the air gap between the stator and the rotor is not materially increased. As will be readily understood, a thick liner for the interior of the stator bore would cause excessive electrical losses with consequent sacrifice of operating efficiency of the motor. Accordingly, in my invention the inner shell 44, and preferably also the outer shell 46, are formed from a very thin metal, such as stainless steel, having the characteristics of a foil and consequently having insufficient mechanical strength to be self-supporting. More specifically, and merely by way of illustration, with an air gap between the stator and rotor of about .012 inch it has been found that a stainless steel stator liner not substantially thicker than about .005 inch will function very satisfactorily with only relatively minor electrical losses.

However, in order to secure the inner sleeve 44 in a satisfactory manner it must be adhered or bonded to the core structure throughout its length and over substantially its entire area as described in detail in my aforementioned Patent No. 2,654,848. To accomplish this desired result, I expand the cylindrical liner or shell 44 into tight engagement with the stator core structure by any suitable means, shrink the outer liner or shell 46 against the exterior of the core structure by any suitable means, and then fill the annular space between the inner and outer shells with a suitable resinous or plastic material having good adhesive properties which retains the windings 42 in place and also bonds to the inner liner 44. As indicated particularly in Fig. 4, the resinous material, designated at 47, surrounds the windings 42 and adheres directly to the bridging portions of the inner shell 44 which extend across the openings of the slots 41. In addition, the resinous material 47 works its way in between the shell 44 and the tooth portions, designated at 48, of the stator core so as to provide a thin metal-to-metal adhesive film 49 therebetween. Consequently, it will be seen that the inner thin liner 44 is firmly bonded and supported by the resinous material 47 throughout the length of the liner and over substantially its entire surface area. As a result of this arrangement, the inner thin liner 44 is able to resist internal motor pressure in spite of its extreme thinness.

As seen in Figs. 1 and 2, the inner and outer shells 44 and 46 also extend beyond the core structure comprising the stacked laminations 39 so as to enclose the end turns or windings 43 at the opposite ends of the core structure. As also seen in Figs. 1 and 2, the concentric inner and outer shells 44 and 46 are preferably closed at their opposite axial ends by means of a pair of annular closure or end members 51 which are likewise made of thin metal. In the form illustrated in the drawing, these end members 51 are ring-shaped elements having a generally U-shaped cross section with the side walls thereof being received within and secured to the corresponding inner and outer shells by welding, soldering, or other suitable means. Wiring connections for the stator windings are brought in through a conductor 52 extending in sealed relationship through the outer flange portion of the closure member 14 and thence through a sealed opening, as at 53, in the upper stator closure ring 51. Of course, it will be understood that a complementary prong or clip arrangement or other suitable lead outlet construction may be employed.

In Fig. 3 I have shown an alternative construction wherein the closure rings 51 for the stator are omitted, and the inner and outer shells, designated at 54 and 56, are open at their opposite axial ends. However, in this case the resinous filler material 47 provides a body of solid sealer material which surrounds and extends beyond the ends of the end turns 43 so as to effectively seal the stator windings and prevent the entry of liquid thereto. Of course, the applicability of the Fig. 3 construction will depend in large measure upon the properties of the resinous filler material 47 which is employed.

In any event, the primary feature of the present invention resides in the fact that the stator 11 is a self-contained completely sealed unit which, as described hereinafter, does not have any rigid or sealed connections with the motor housing. Thus, the combination of the inner and outer concentric shells 44 and 46 and the resinous filler material 47 (either with or without the end closures 51) provides an annular stator which may be characterized as a self-contained unit or cartridge capable of being fitted in slidable relation within the outer motor casing 10. In other words, the stator unit 11 is readily insertable and removable from the motor casing thereby greatly facilitating initial assembly of the motor as well as replacement and repair.

It will be understood from Fig. 1 that there is a simple sliding or frictional fit between the outer shell 46 of the stator 11 and the external motor casing 10. In order to facilitate insertion of the stator unit 11 within the outer casing 10, I preferably provide the upper and lower end portions of the stator unit with a somewhat smaller external diameter than the central portion containing the stacked laminations or core 39. Thus, as clearly seen in Fig. 2, the outer shell 46 is depressed inwardly, as at 57, above and below the stacked laminations 39 thereby providing the desired decreased external diameter at the opposite end portions of the stator unit 11. Obviously, this construction greatly facilitates slidable endwise insertion of the stator unit 11 into the external motor casing 10 and when the motor is thus assembled the upper and lower end portions of the stator unit 11 will be spaced slightly from the outer motor casing 10, as indicated at 58 in Fig. 1, but the central core portion comprising the stacked laminations 39 has the desired snug sliding fit with the casing 10. As also seen from Figs. 1 and 2, the innermost shell or liner 44 also has its opposite end portions pressed outwardly, as at 59, to a somewhat greater extent than the portion extending over the core structure 39 with the result that the internal diameter of the stator unit is slightly enlarged at its opposite end portions so that the insertion of the rotor 12 into the bore of the stator unit 11 is also facilitated, as will be readily understood. Inasmuch as the outer shell 46 of the stator unit 11 is shrunk or otherwise drawn tightly around the exterior of the stator core, the end portions of this shall having the decreased external diameter are preferably provided with a short axially extending and circumferentially spaced grooves or indentations 61 (Fig. 1) which extend radially inwardly from the outer surface of the stator in order to take up the excess metal and thereby insure a tight snug fit of the outer shell 46.

Since the stator unit 11 has a removable or slidable fit within the external casing 10, which is of greater length than the stator unit 11, suitable means must be provided for holding or retaining the stator in predetermined position in the casing. In the embodiment shown in the drawing this is accomplished by means of a plurality of retainer members in the form of cylindrical posts or spacers 62 each having a depending projection 63 which is received within a complementary socket in the flange portion 18 of the bottom closure member 16. A cushioning or shock-absorbent insert 64 of a compressible or resilient material such as rubber is provided at the upper end of each member 62 and engages the lower closure ring 51 of the stator unit 11 for supporting the latter. Obviously, any desired number of these supports or spacer members may be provided around the lower end of the stator unit and coacting with the bottom closure 16, but three will usually suffice. The provision of the rubber insert 64 prevents inadvertent damage to the thin metal comprising the stator closure ring 51 and also accommodates a certain degree of axial or endwise expansion of the stator unit as the motor heats up during operation. A similar set of spacers or retainer elements, indicated generally at 66, of a somewhat smaller size in this case are also preferably provided between the upper end closure 14 for the motor and the upper end of the stator unit 11.

From the foregoing, it will be seen my invention provides a novel and highly advantageous construction in submersible motor art in that for the first time a self-contained completely sealed stator unit is provided which is detachably fitted in a substantially sliding relation within the motor housing and without being permanently connected to the motor housing. Thus, the invention greatly facilitates and minimizes the expense of maintenance and repair because of the ease with which the stator unit may be removed and replaced. As will be readily understood, the motor end closures 14 and 16 are disassembled from the casing 10 by removal of the screws 21. Thereafter, the lugs 19 can be withdrawn through the slots 20 and thus detached from the casing 10 and the stator unit 11 is thereafter removed in a simple fashion by sliding the same out of the casing 10. The invention also permits the use of a plurality of cartridge stator units within a single motor housing, the several units being interconnected by suitable detachable electrical connections so that a motor of any desired capacity can readily be assembled to meet the requirements of a particular installation.

Although the invention has been described in connection with certain particular structural embodiments thereof, it will be understood that various modifications and equivalent structures may be resorted to without departing from the scope of the invention as defined in the appended claims.

I claim:

1. In a submersible motor, the combination of an elongated housing, an annular stator unit slidably fitted in said housing for ready removal therefrom, said stator unit being axially shorter than said housing, end closures detachably secured to said housing at the opposite ends thereof, and a plurality of spacer members axially interposed between each of said end closures and the corresponding ends of said stator unit for holding the latter in predetermined location axially of the housing, said spacer members having resilient cushion means at their inner ends engaging said stator unit whereby to protect the latter and also to accommodate axial expansion thereof.

2. The structure of claim 1 further characterized in that said spacer members are circumferentially spaced around said end closures and are detachable therefrom.

3. In a submersible motor, an external casing, end closures detachably secured to the opposite ends of said casing, an annular stator having a sliding fit within said casing to facilitate ready removal of the stator, and resilient spacer means coacting between said end closures and the opposite ends of said stator for holding the latter in predetermined position axially of the housing but accommodating axial expansion of said stator.

4. In a submersible motor, the combination of an external housing, upper and lower end closures detachably secured to opposite ends of said housing, an annular self-contained completely sealed stator slidably fitted within said housing, said upper end closure having aperture means permitting entry of liquid into the interior of the motor and said lower end closure being sealed whereby substantially only a single filling of liquid enters the motor and continuous passage of fresh liquid through the motor is thereby avoided, and annular sealing means interposed between said end closures and the adjacent end portions of said stator whereby to prevent access of liquid from the interior of the motor to the interior of said housing.

5. In a submersible motor, the combination of an elongated housing, an annular stator unit slidably fitted in said housing for ready removal therefrom, said stator unit being axially shorter than said housing, end closures detachably secured to said housing at the opposite ends thereof, and a plurality of rigid spacer members axially interposed between each of said end closures and the corresponding ends of said stator unit for holding the latter in predetermined location axially of the housing, the inner ends of said spacer members being provided with compressible cushions engaging the ends of the stator unit whereby to avoid damage to the stator unit.

6. The structure of claim 5 further characterized in that said stator unit comprises a laminated core structure having a central bore, a pair of inner and outer shells disposed in concentric relation at the interior and exterior of said core structure, a pair of annular end members of thin material sealed to the ends of said shells to define a liquid tight chamber therebetween, and a body of resinous filler material in said chamber for enclosing and sealing said core structure, said cushions preventing damage to said annular end members.

7. In a submersible motor, the combination of an external tubular housing, end closures detachably secured to opposite ends of said housing and having inwardly projecting axial extensions adapted to receive the ends of a rotor shaft, an annular self-contained completely sealed stator unit slidably fitted within said housing and having opposite end portions in telescopic relation with said axial extensions, at least one of said end closures having aperture means permitting entry of liquid into the interior of the stator unit, and a pair of annular seals interposed between said axial extensions and said end portions of said stator unit whereby to prevent access of liquid from the interior of the stator unit to the interior of said housing.

References Cited in the file of this patent

UNITED STATES PATENTS

| | | |
|---|---|---|
| 1,678,380 | Cooper | July 24, 1928 |
| 2,080,678 | Van Horn et al. | May 18, 1937 |
| 2,428,236 | Maxwell | Sept. 30, 1947 |
| 2,428,816 | Sigmund et al. | Oct. 14, 1947 |
| 2,573,126 | Andrus | Oct. 30, 1951 |
| 2,583,804 | Andrus | Jan. 29, 1952 |

FOREIGN PATENTS

| | | |
|---|---|---|
| 121,490 | Great Britain | Dec. 18, 1918 |
| 283,921 | Great Britain | Sept. 20, 1928 |
| 463,015 | Great Britain | Mar. 19, 1937 |